United States Patent [19]
Orlamünder et al.

[11] Patent Number: 6,026,710
[45] Date of Patent: Feb. 22, 2000

[54] TORSIONAL VIBRATION DAMPER WITH A FRICTION DEVICE

[75] Inventors: Andreas Orlamünder, Schweinfurt; Reinhard Feldhaus, Ebenhausen; Bernd Peinemann, Niederwerrn; Jürgen Kleifges, Schweinfurt, all of Germany

[73] Assignee: Mannesmann Sachs AG, Schweinfurt, Germany

[21] Appl. No.: 09/036,836

[22] Filed: Mar. 9, 1998

[30] Foreign Application Priority Data

Mar. 7, 1997 [DE] Germany .......................... 197 09 343

[51] Int. Cl.[7] .................................................. F16F 15/129
[52] U.S. Cl. .......................................... 74/574; 192/214.1
[58] Field of Search ................................ 74/574; 464/66, 464/68; 192/214.1, 214, 70.17

[56] References Cited

U.S. PATENT DOCUMENTS

| | | |
|---|---|---|
| 4,751,993 | 6/1988 | Fukushima . |
| 4,782,933 | 11/1988 | Jackel et al. ...................... 192/70.17 X |
| 4,904,225 | 2/1990 | Worner et al. ......................... 74/574 X |
| 4,932,286 | 6/1990 | Fukushima . |
| 5,176,233 | 1/1993 | Woerner et al. . |
| 5,598,745 | 2/1997 | Tsuchiya .................................. 74/574 |
| 5,707,292 | 1/1998 | Koda et al. ....................... 192/214.1 X |
| 5,771,999 | 6/1998 | Kleifges et al. .................. 192/214.1 X |

FOREIGN PATENT DOCUMENTS

| | | |
|---|---|---|
| 2618199 | 1/1989 | France ..................................... 74/574 |
| 2 675 872 | 10/1992 | France . |
| 35 16 291 C2 | 11/1986 | Germany . |
| 38 00 566 A1 | 8/1988 | Germany . |
| 38 07 133 | 9/1988 | Germany . |
| 2 125 933 | 3/1984 | United Kingdom . |
| 2 287 083 | 9/1995 | United Kingdom . |
| 2 303 900 | 3/1997 | United Kingdom . |

*Primary Examiner*—Mary Ann Battista
*Attorney, Agent, or Firm*—Cohen, Pontani, Lieberman & Pavane

[57] ABSTRACT

A torsional vibration damper is equipped with a drive-side transmission element and an output-side transmission element deflectable relative thereto. A friction device is connected between the transmission elements. The friction device has a friction element with at least two different friction areas. The friction element is arranged in a circumferential opening having circumferential ends in one of the transmission elements. As long as the friction element is movable within the circumferential opening relative to the ends of the circumferential opening, only a first friction area of the friction element is active. When the friction element contacts one of the circumferential ends of the circumferential opening, only a second friction area of the friction element is active.

14 Claims, 7 Drawing Sheets

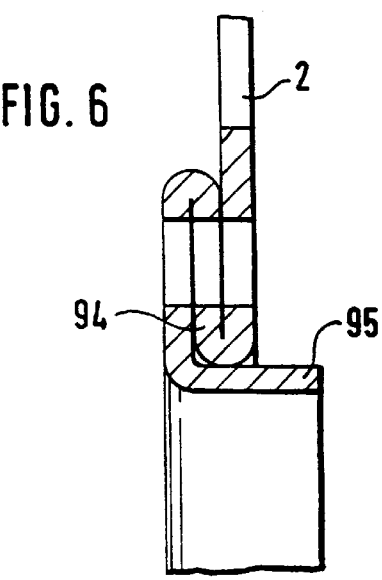
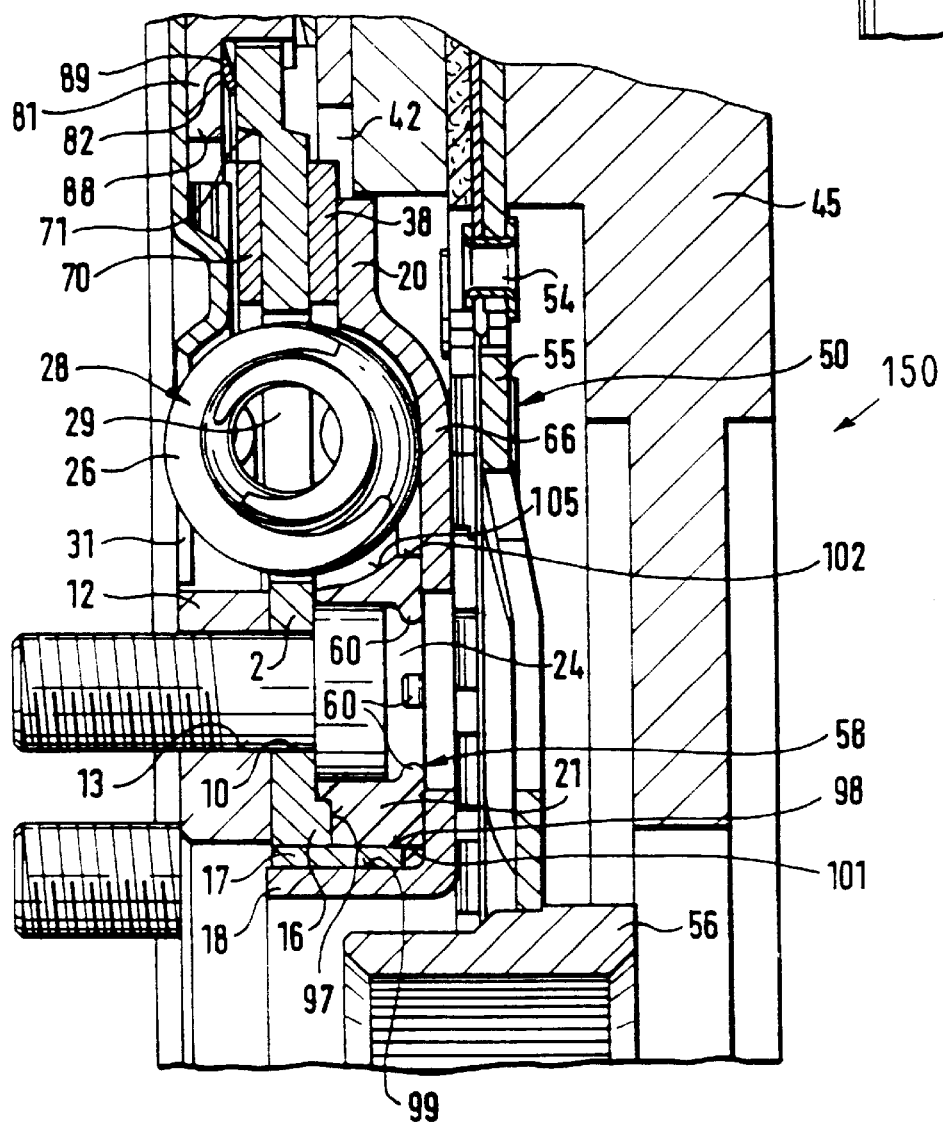

TORSIONAL VIBRATION DAMPER WITH A FRICTION DEVICE

BACKGROUND OF THE INVENTION

1. Field of the Invention

The invention relates to a torsional vibration damper with a friction device for installation in a vehicular transmission.

2. Description of the Related Art

A torsional vibration damper for a vehicular transmission is known, for example, from DE 35 16 291 C2, which has a drive-side transmission element and an output-side transmission element that is rotatable relative to the drive-side transmission element, wherein each of the drive-side and output-side transmission elements comprises a centrifugal mass. A friction device which has two separate friction elements is operatively held between the transmission elements. A friction disk pressurized by an axial spring is operatively held between the transmission elements in their radial inner area. During any movement of the two transmission elements relative to each other, the friction disk produces a base friction effect of the device. Provided radially outside of this friction disk is an angled friction piece that axially penetrates one of the transmission elements with clearance in the circumferential direction. As the relative movement between the two transmission elements increases, the amount of clearance in the circumferential direction decreases. As soon as this clearance is used up, the angled friction piece acts in addition to the aforementioned friction disk, so that an additional load friction is added to the base friction effect.

This friction device makes it possible to counteract greater torsional vibrations with greater friction. However, because of the two separate friction elements, the device is relatively large and expensive. Furthermore, because the base friction effect is applied at all times, the load friction can only reinforce the base friction. The jump between the two levels of friction, especially using the materials which are normally used, is relatively large. Thus, no finely-graduated adjustment of the friction effect to particular operating conditions is possible and the vehicle in which this torsion damper is installed is driven with either too much or too little friction.

Another friction device between transmission elements that are movable relative to each other is described in DE 38 00 566 A1. This friction device has friction elements that are dependent on centrifugal force and thus on speed. Attached to one of the transmission elements is an angled friction piece. A counter friction element is urged into resting contact with a radially outer area of the angled friction piece. During increasing centrifugal force, the spring is compressed and the friction between the angled friction piece and the counter friction piece is thus reduced.

In prior art device having speed-dependent friction elements such as those described in the above prior art documents, the relatively high construction costs of these devices are accepted as a trade off for the advantageous results.

SUMMARY OF THE INVENTION

The object of the invention is to provide a torsional vibration damper for a vehicular transmission with a plurality of different friction areas that are available for attaining any desired friction effects with minimum construction and spatial expenditure.

According to the invention, this object is attained by a torsional vibration damper having friction areas on a section of a common friction element. The friction element is positioned between a drive-side transmission element and an output side transmission element and the friction element penetrates a circumferential opening in one of the transmission elements. As long as the friction element remains relatively movable with respect to a circumferential end of the circumferential opening in the direction of relative movement, only a first friction area is active. After the friction element contacts this end of the circumferential opening, a different friction area is active.

Embodying a plurality of friction areas on sections of a common friction element of the friction device ensures that only one of these friction areas is active at one time. Which one of the plurality of friction areas is active depends on the operating conditions of the torsional vibration damper and thus on the movement states of the transmission elements relative to each other. The movement states are directly related to the clearance provided in the circumferential direction for each friction element. For example, when the aforementioned clearance in the circumferential direction is not yet closed during movements of the drive-side transmission element that result from torsional vibrations, a relative movement of this transmission element with respect to the friction element is permitted. In contrast, a relative movement between the friction element and the output-side transmission element is effectively inhibited by the normal forces exercised by at least one axial spring. The first friction area thus lies axially between the drive-side transmission element and the friction element.

As soon as the aforementioned clearance is closed, the friction elements are also moved during deflections of the drive-side transmission element, so that there is no longer any relative movement in the first friction area. Instead, a second friction area is now created between the drive-side and the output-side transmission elements. This second friction area can have one or more friction surfaces, depending on whether the friction element connects directly with only one cover plate of the output-side transmission element or with multiple cover plates. The connection may also be made via a spring instead of directly.

Depending on the material chosen for the sections of the friction elements, the average friction radii of the friction elements, and the number of friction surfaces selected for a particular friction area, the two friction areas can be adjusted to each other such that, when the friction effect passes from one friction area to the other, the step thereby executed can be very finely adjusted with respect to friction effect. Furthermore, since the friction device is embodied on a common friction element comprising all of the sections, each of which has one friction area, the friction device has a very simple and relatively compact design.

The normal force required to produce friction is preferably attained by the use of at least one axial spring. Using a different axial spring for each friction area facilitates the aforementioned sensitive adjustability of the different friction effects to particular case requirements. Of course, if only one axial spring is used for multiple friction areas the manufacturing process would be much more efficient. There are less part to assemble there would be less waste during manufacture because axial springs of this type are usually stamped from full spring disks with the radially inner waste piece thereby created being larger as the diameter size of the axial spring increases. It is also conceivable to use a spring that, seen in the radial direction, comprises two plate springs connected radially to each other and arranged coaxially relative to each other. These plate springs, during the stamping of the radially inner area, could be perforated at their connection point so as to break apart under stress during the assembly or operation of the torsional vibration damper at a deliberately intended breaking point and thereafter act as two different axial springs. The perforation may also be embodied in such a way that the narrow connecting fixed member that remains minimizes the reciprocal influence of the spring characteristics of the two spring parts, so that the breaking in two is unnecessary.

It is possible to connect the different sections of a friction element to one another by a link that is flexible in the axial direction. A spring arm acts on a corresponding section of the friction element depending on the effective distance of the shoulder part of an axial spring to this link. Selecting the one suitable diameter of the axial spring on the circumference with which this axial spring acts upon the section of the friction element influences the friction effect attainable by the associated friction area. Even better adjustability is achieved when a single axial spring acts in the extension area of the link between the sections of a friction element, so that any diameter change in the axial spring leads immediately to a considerable change in the friction effect in the associated friction area.

The above description refers to the advantage of having different friction areas. One means for adding a friction area includes accommodating at least one friction means in the drive-side transmission element with clearance in the circumferential direction for rotation of the friction means relative to the drive-side transmission element. The friction means is associated with the friction element or friction elements, and the clearance is greater than that which exists relative to the friction element. As described in the embodiment above, a first friction area exists axially between the friction element and the drive-side transmission element as long as the clearance of the friction element is not closed. After the clearance of the friction element in the drive-side transmission element closes, the friction area shifts to a second friction surface that is located axially between the friction means and the friction element. This occurs because the friction element moves with the drive-side transmission element and moves relative to the output-side transmission element. The friction means, which still has clearance, follows the movement of the output-side transmission element. A third friction area is not created until the clearance of the friction means is also closed. From that point on, the friction element and the friction means move synchronously with the drive-side transmission element, and the movement of these elements occurs relative to the output-side transmission element. The third friction area then lies between the friction means and the output-side transmission element. A friction coefficient changeover can be achieved by suitable selection of the material for the friction elements.

In another embodiment, a plurality of friction elements are connected to one another so that movements of the individual friction elements relative to one another are possible. The advantage of this configuration is that the individual friction elements behave during storage and assembly like a friction ring, i.e., a single component, and are movable radially outward in the operating state of the torsional vibration damper under the influence of centrifugal force. The friction elements are, for example, pressed in their circumferential opening in the drive-side transmission element which allows clearance in the circumferential direction. The friction elements are also adjustable in the radial direction to the dimensions of the friction elements onto the outer edge of this circumferential opening to thus produce an additional speed-dependent friction effect.

If the elimination of the speed-dependence of the friction is desirable, the connections of the friction elements are made radially rigid to intercept the centrifugal force.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

Examples are described in greater detail below with reference to the drawings. In the drawings:

FIG. 5 shows a longitudinal sectional view of another embodiment of a torsional damper;

FIG. 6 shows a partial view of an embodiment of a radial bearing of the torsional vibration damper;

DETAILED DESCRIPTION OF THE
PRESENTLY PREFERRED EMBODIMENTS

Figure 1:
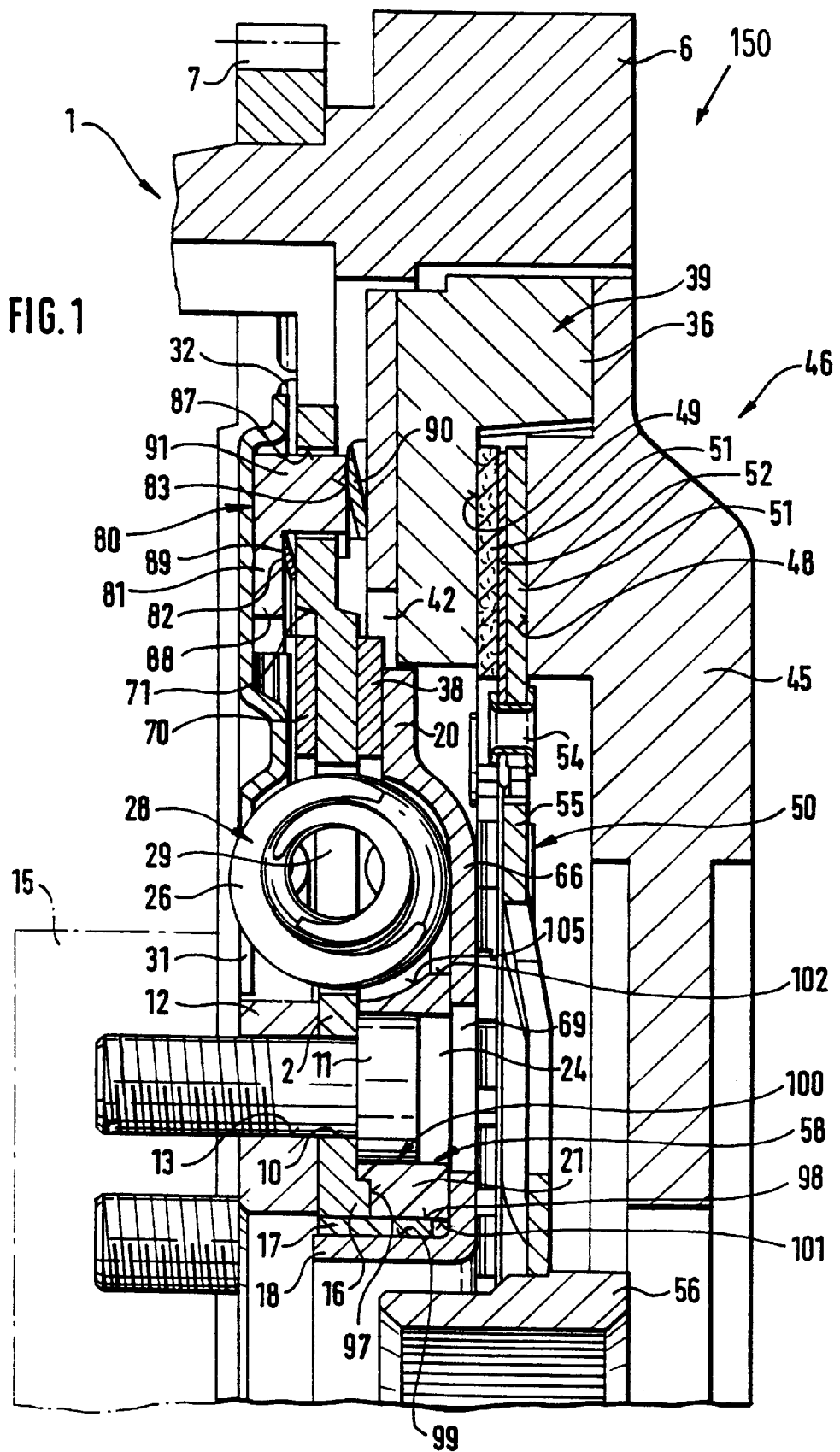
FIG. 1 shows a radially halved longitudinal section of a torsional vibration damper in accordance with an embodiment of the invention.
Figure 2:
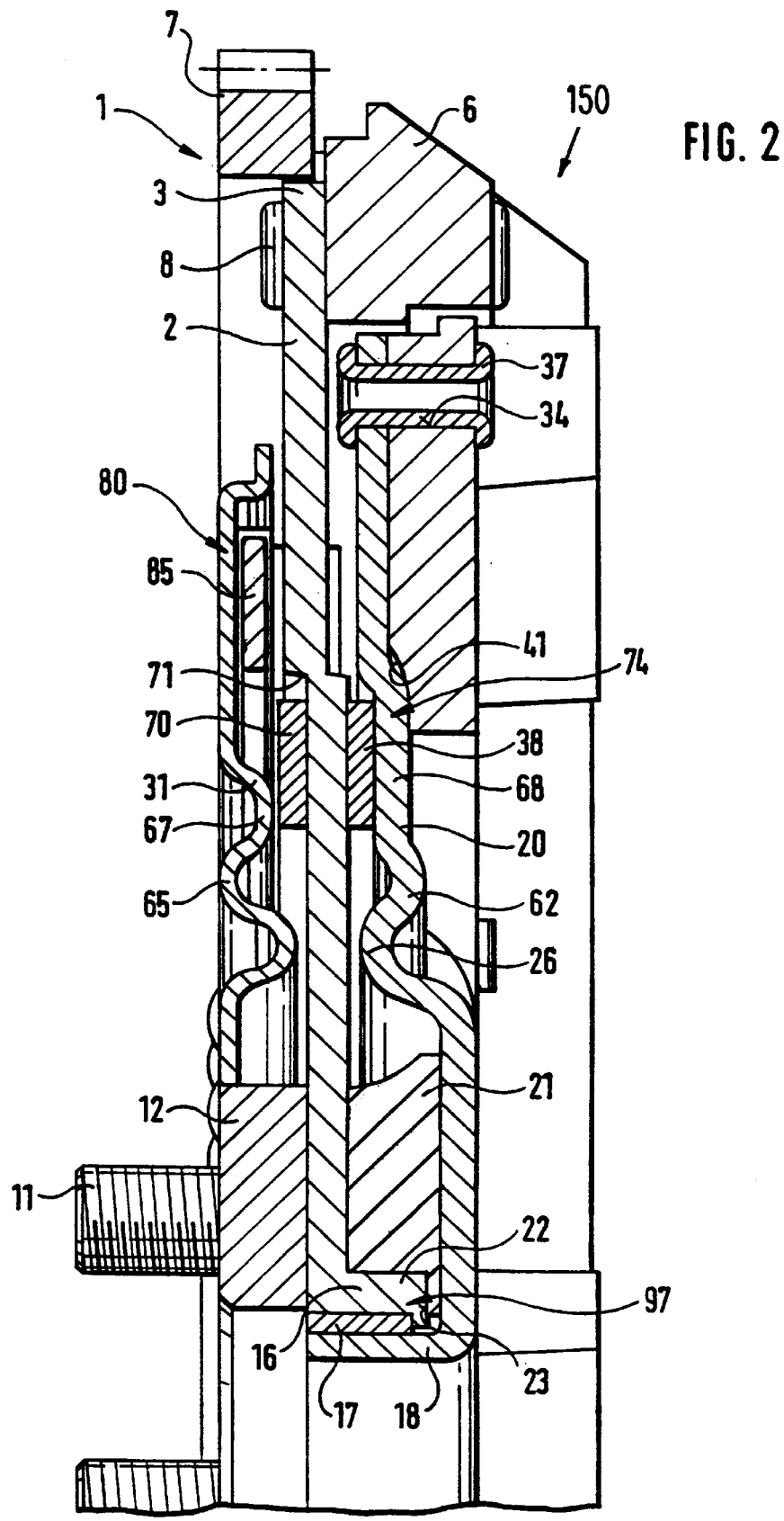
FIG. 2 shows a different longitudinal section of the torsional vibration damper as in FIG. 1, angularly offset with respect to FIG. 1.
Figure 3:
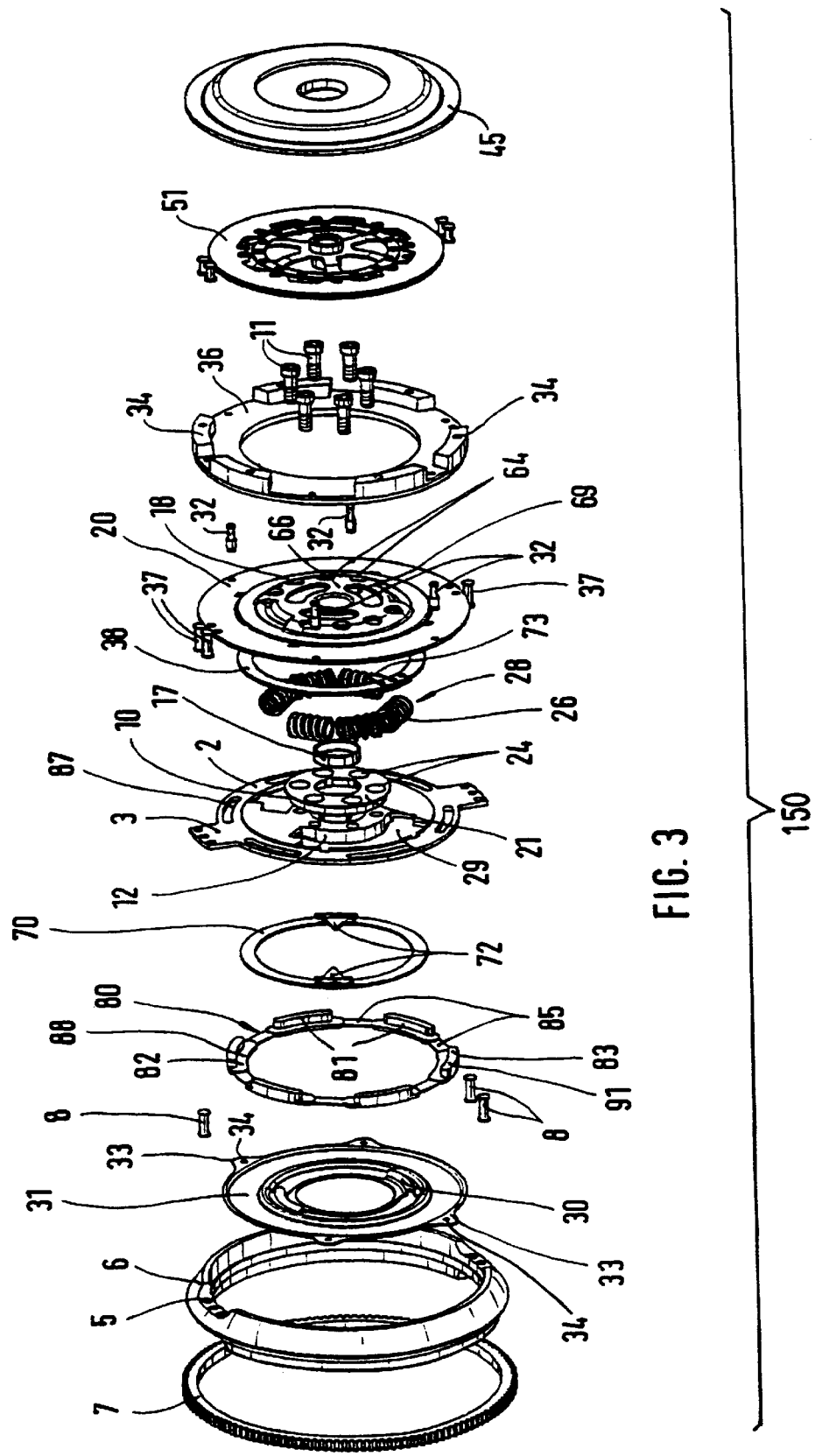
FIG. 3 is an exploded view of the torsional vibration damper of FIG. 1.

With reference to FIGS. 1–3, a torsional vibration damper 150 has a drive-side transmission element 1 with a primary flange 2 that runs radially outward. FIGS. 2 and 3 show that the circumferential area of the primary flange 2 has radial projections 3, each of which engages a slot 5 of a ring-shaped drive-side centrifugal mass 6. The circumferential area of the centrifugal mass 6 has a geared ring 7 which engages with a starter pinion (not shown). Rivets 8 are used to attach the drive-side centrifugal mass 6 to the primary flange 2. The rivets 8 pass through borings in the radial projections 3 and in the drive-side centrifugal mass 6. A positive-locking connection is attained between the primary flange 2 and the drive-side centrifugal mass 6 because the radial projections 3 of the primary flange 2 engage the slots 5 of the drive-side centrifugal mass 6.

The radially inner area of the primary flange 2 has passageway openings 10 for attachment means 11, which also pass through passageway openings 13 in a distance ring 12 for connecting the torsional vibration damper to a crank shaft 15 (indicated by the dashed-dotted line in FIG. 1) of a drive (e.g., an internal combustion engine). The distance ring 12 establishes an axially fixed connection of the primary flange 2 to the crank shaft 15.

The radially inner end of the primary flange 2 acts as a primary hub 16 which accommodates a radial slide bearing 17 (hereinafter referred to as the radial bearing 17). The radial bearing 17 has an inner circumference 99 and encompasses a secondary hub 18 which is the radially inner end of an output-side cover plate 20 and directed toward the crank shaft 15. The primary flange 2, in the area of its primary hub 16, includes axial projections 22 in engagement with axial depressions 23 of an axial slide bearing 21 (hereinafter referred to as the axial bearing 21). The axial bearing 21 is secured against rotation relative to the primary flange 2 by a positive lock 97 so that passageway openings 24 in the axial bearing 21 align with the passageway openings 10 in the primary flange 2 and the passageway openings 13 in the distance ring 12. The attachment means 11 for connecting the torsional vibrational damper 150 to the crank shaft 15 are thus inserted through all passageway openings 10, 13 and 24. To secure attachment means 11 and protect against loss of the attachment means 11, the diameter of the passageway openings 24 of the axial bearing 21 are sized such that the attachment means 11, at the point of their largest diameter, must be pushed through the passageway openings 24 under application of an axial force (this is especially true in an embodiment wherein the axial bearing 21 comprises plastic). As a result, the axial bearing 21 performs the additional function of a loss protector 58. Of course, loss protection for the attachment means may be achieved in other ways. In FIG. 5, for example, axially elastic journals 60 that project radially inward in the extension areas of the passageway openings 24 act as the loss protector 58.

In contrast to the axial bearing 21, which can be made of plastic (e.g., polyamide with a teflon additive), the radial bearing 17 is preferably embodied with a steel protective shell, which is attached radially outside to the primary hub 16. This steel protective shell carries teflon-coated bronze as a run-in layer in which dirt particles and chips are embedded and thus cause no damage. Instead of two separate bearings, the axial bearing 21 and radial bearing 17 may be combined in one component. This embodiment leads to advantages and benefits related to production technology, especially when this combined bearing is produced as an injection molded part. A wide variety of plastic and metal materials can be used for a combined bearing of this type.

The axial bearing 21 ensures that a required distance is maintained between the primary flange 2 and the output-side cover plate 20 and prevents wear stemming from a conventional friction clutch 46 (shown only schematically) from penetrating the endangered radial bearing 17. Instead, the wear remains in the area of the passageway openings 24 of the axial bearing 21. The radial dimensions of the axial bearing 21 are therefore such that its inner circumference 101 encompasses the radial bearing 17. However, a diameter of the inner circumference 101 is only insignificantly larger than an outer circumference 98 of the radial bearing 17. As a result, the axial bearing 21, with its inner circumference 101, remains radially inside the indentations 69 of the output-side cover plate 20.

An outer circumference 102 of the axial bearing 21 is positioned radially outside of the indentations 69 of the output-side cover plate 20. As a result, an adequate support surface is created on the output-side cover plate 20 by the axial bearing 21, despite the large indentations 69. To nonetheless provide adequate structural space for other components arranged radially outside of the axial bearing 21 (e.g., springs 26 of a damping device 28) the outer circumference 102 of the axial bearing 21 has a profiling 105, which undergoes a diameter reduction in the direction of the primary flange 2 starting from the side of the axial bearing 21 facing the cover plate 20. The curve of this profile 105 is adjusted in the axial direction to the circumferential curve of the springs 26. This constructive measure allows the springs 26 to be offset far inward radially, despite the radially large axial bearing 21 that offers the aforementioned advantages, so that there is sufficient space radially outside the springs 26 for the arrangement of the output-side centrifugal mass 36. As a result, a torsional vibration damper 150 of a given radial size attains an extremely compact structure in the axial direction.

The axial bearing 21, because it rests on the primary flange 2 as well as on the cover plate 20, acts as a dust-protective covering 100 for the radial bearing 17.

The springs 26 are placed in windows 29 of the primary flange 2 and in windows 30 of a drive-side cover plate 31. The springs 26 can also be pressurized by control elements (not shown) of the output-side cover plate 20. As FIG. 3 shows more clearly, the springs 26 are surrounded by intermediate rings 38 and 70. Each one of intermediate rings 38 and 70 includes a pair of control tips 72 (on intermediate ring 70) and 73 (on intermediate ring 38). Each pair of control tips 72 and 73 are offset relative to each other by 180 degrees and are attached to their respective intermediate rings 38 and 70 by a riveted joint. These intermediate rings 38 and 70 are held axially between the primary flange 2 and the drive-side cover plate 31, on the one hand, and between the primary flange 2 and the output-side cover plate 20, on the other. For this purpose, the drive-side cover plate 31 includes an axial support 67 and the output-side cover plate 20 includes an axial support 68, as shown in FIG. 2. In the embodiment shown, the intermediate rings 38 and 70 are centered by means of the springs 26. However, the drive-side intermediate ring 70 may be guided by radial enlargement into an area of an axial shoulder 71 (shown in FIGS. 1 and 2) on the primary flange 2. This would result in a centering of the intermediate ring 70 from the radially outward direction. Such centering is achieved by suitably shaping the primary flange 2 on its side facing the intermediate ring 38. The primary flange 2 would thus be embodied with radial securing mechanisms.

The intermediate rings 38, 70 function by the respective engagement of their control tips 72, 73 between two of the springs 26. Torsional vibrations introduced by the crank shaft 15 via the primary flange 2 are conducted to a first spring 26, for example, and from there via a first intermediate ring, e.g., the intermediate ring 70, via its control tip 72 to a second spring 26, and from there in turn via the control tip 73 of the second intermediate ring 38 to the cover plates 20 and 31, which then act as an output-side transmission element 39. Of course, the individual springs 26, which are connected one behind the other, can be embodied with varying rigidity, so that the damping device 28 acts in various steps. The embodiment of the damping device 28 will not be discussed in greater detail at this point. However, it is vital to note that the springs 26 of the damping device 28 are located radially inside of friction linings 51, which are accommodated on a lining suspension 52 and connected via a riveted joint 54 to a carrier disk 55 of a clutch disk 50 that, in its radially inner area, is equipped with a hub 56 for placement upon a transmission shaft (not shown). The interesting feature of this clutch disk 50 is basically that the aforementioned riveted joint 54 is located on the radially inner end of the friction lining 51, so as to not penetrate disruptively into the friction area, which consists of a friction surface 48 of a clutch housing 45 (shown only schematically) of the friction clutch 46 and a counter friction surface 49 of an output-side centrifugal mass 36.

Figure 4:
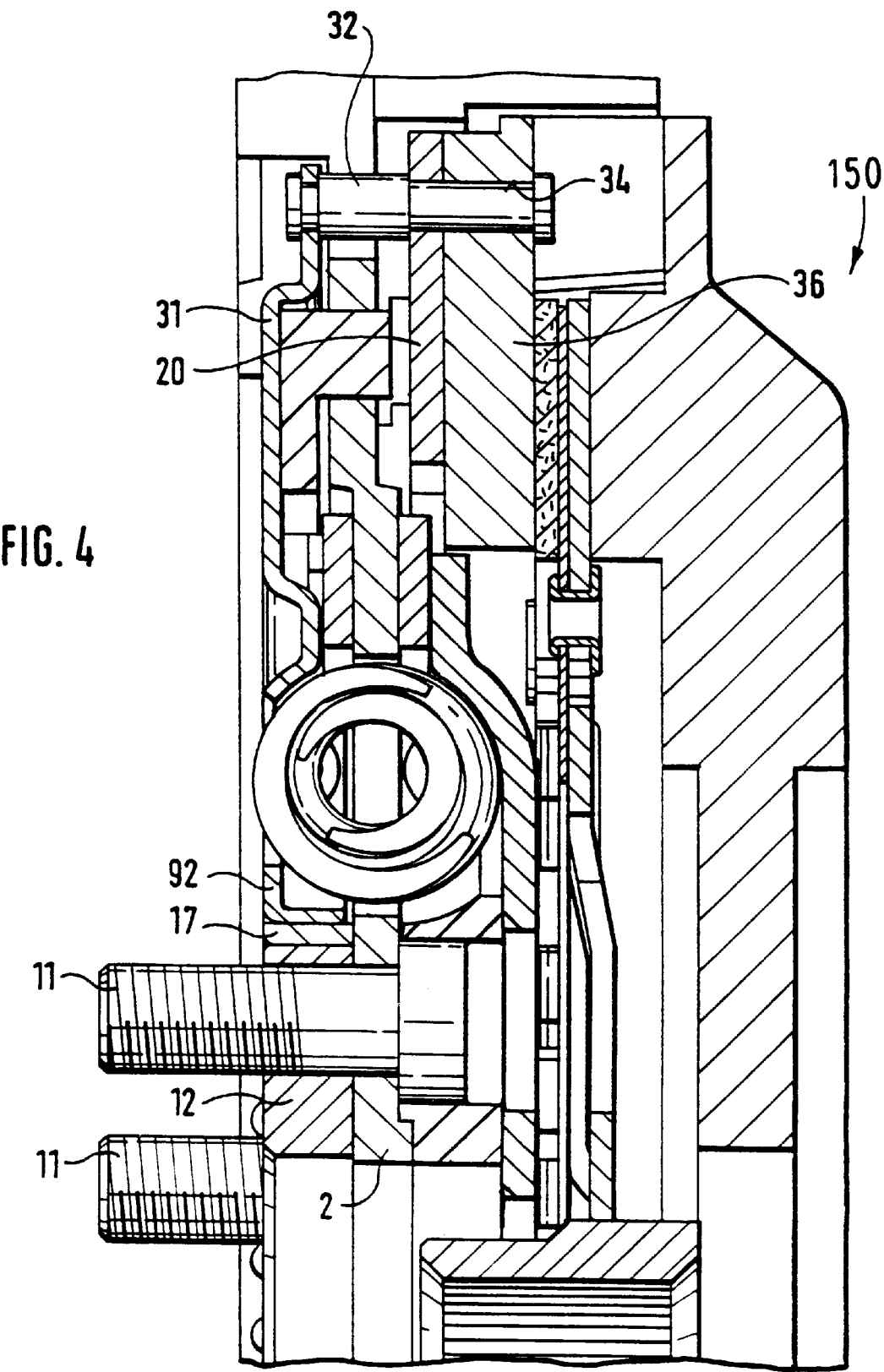
FIG. 4 shows a longitudinal sectional view of another embodiment of a torsional damper with different radial bearing than in FIG. 1.

As FIG. 4 shows most clearly, the cover plates 20 and 31 are connected to each other by spacing bolts 32. The spacing bolts 32 hold the cover plates 20 and 31 at a fixed distance from each other and connect the cover plate 20 to the output-side centrifugal mass 36 which has passageway openings 34 for this purpose. The output-side centrifugal mass 36 is thus also part of the output-side transmission element 39. The output-side cover plate 20 is also connected by rivets 37 to the output-side centrifugal mass 36. The drive-side cover plate 31 has radial shoulders 33 (FIG. 3) with passageway openings 34 to accommodate the spacing bolts 32.

To save axial space, a radially outer region of the output-side cover plate 20 is guided toward the primary flange 2 from a radially central area of the output-side cover plate 20. That is, a portion of the output-side cover plate 20 radially outside of a guided portion 74 runs substantially parallel to the primary flange 2. A surface is created on the radially outer area of the output-side cover plate 20 that is radially large enough to accommodate the output-side centrifugal mass 36, and which comprises a counter friction surface 49 for the friction lining 51 of the clutch disk 50. To make the area of the friction lining 51 large enough, the output-side centrifugal mass 36 must be radially farther inward than the radially outer area of the output-side cover plate 20. Because of this, the cover plate 20 includes axial bulges 40 (shown in FIG. 2), in the area of its guided portion 74 which run around the circumferential area of the adjacent intermediate ring 38. Recesses 42 are provided between each two axial bulges 40 in the circumferential direction (see FIG. 1) which permit the passage of the intermediate ring 38 at this point. The recesses 42 create space that allows the output-side centrifugal mass 36 to extend sufficiently far radially inward. The centrifugal mass 36 includes one recess 41 in the area of each axial bulge 40 on its side facing the output-side cover plate 20. This engagement of the axial bulges 40 into the recesses 41 creates a rotation-proof connection of the output-side centrifugal mass 36 to the output-side cover plate 20. This configuration, given a minimum axial extension of the torsional vibration damper, ensures a sufficient thickness of the output-side centrifugal mass 36 in the axial direction. This thickness and the stability associated with it are absolutely necessary for the centrifugal mass 36 to effectively fulfill its function as the counter friction surface 49 for the friction linings. Reinforcements 62 with a sectionally wave-shaped cross-section (see FIG. 2) are provided in the radially central area of the cover plate 20. The reinforcements 62 may be used to control the inner springs (not shown) of a damper. The ability of the cover plate 20 to withstand axial forces initiated by a conventional friction clutch is increased by a closed spring window in the area of fixed members 66 (FIG. 1). The drive-side cover plate 31 also has these control reinforcements 65.

As FIG. 3 shows in greater detail, the output-side cover plate 20 has openings 64 in the radial area of the springs 26 which primarily reduce the weight of the cover plate 20 without reducing its strength. Fixed members are provided radially inside of these openings which run radially inward and establish a connection to the secondary hub 18. A recess 96 is disposed between each two fixed members 66 in the circumferential direction is a recess 69. Each recess 69 permits access to two attachment means 11. The openings 64 and the recesses 69 promote cooling of the damping device 28, but only to a marginal degree because there is no adequate discharge for the air that does enter through the openings 64 and recesses 69. The space is sealed off axially adjacent to the recesses 69 by the axial bearing 21, thereby preventing air that has entered through the openings 64 from flowing radially outward through the intermediate rings 38 and 70. However, after passing through the springs 26, such air can again emerge in the substantially axial flow direction on the side of the crank shaft 15.

A frictional device 80, which is best viewed in FIG. 3 is positioned in the radial outer area of the primary flange 2. The frictional device 80 has a plurality of friction elements 81 distributed along the circumference in the form of friction pads. Each friction element 81 includes a section 88 that forms a first frictional area 82 and a section 91 that forms a second frictional area 83. Connections 85 connect the friction elements 81 to one another, but allow movement of the individual friction elements 81 in both the radial and axial directions. The entire side of the friction elements 81 facing the drive-side cover plate 31 rest on the drive-side cover plate 31. Each of the sections 88 of friction element 81 that have the first friction area 82 is supported via an axial spring 89 on the primary flange 2. In contrast the axially larger section 91 of each friction elements 81 passes through a circumferential openings 87 in the primary flange 2 and is supported by an axial spring 90 on the output-side cover plate 20. The axial spring 90 contacts the second friction area 83 of the friction elements 81. To allow this second friction area 83 to function, the circumferential openings 87 in the primary flange 2 are larger in the circumferential direction than the extension width of the friction element 81.

The function of the friction device 80 is as follows: During very small torsional vibrations (i.e., during small movements by the drive-side transmission elements 1 relative to the output-side transmission element 39 in the circumferential direction) the section 91 with the second friction area 83 is moved circumferentially inside a corresponding circumferential opening 87 without reaching the circumferential-side ends. In this operating state, the friction elements 81 are pressed by the axial spring 89 as well as the axial spring 90 against the drive-side cover plate 31. Because the drive-side cover plate 31 is part of the output-side transmission element 39, the latter then carries out a movement relative to the drive-side primary flange 2. The relative movement between the output-side transmission element 39 and the drive-side primary flange 2 causes a friction effect on the first friction area 82 via the friction elements 81 with the axial spring 89 connecting the primary flange 2. At this point in time, no friction exists between the friction elements 81 and the output-side cover plate 20, because the output-side cover plate 20 and the drive-side cover plate 31 move synchronously with friction device 80 between them. In this operating state, the axial spring 90 thus serves only to apply an axial pressure force.

When the primary flange 2 is deflected far enough in the circumferential direction that the ends of the circumferential openings 87 associated with this direction take along the friction elements 81, no relative movement exists any longer between the primary flange 2 and the section 88 of the friction element 81 having the first friction area 82. The axial spring 89 serves only to apply an axial force, by means of which the friction elements 81 are pressed against the drive-side cover plate 31. The friction elements 81 now move relative to the drive-side cover plate 31 as well as the output-side cover plate 20. As a result, friction exists not only between the drive-side cover plate 31 and the friction elements 81, but also between the sections 91 of the friction elements 81 and the output-side cover plate 20 via the axial spring 90.

It is worthy to note here that two different frictional operating conditions are established with the friction elements 81. As a result, the different friction requirements of such torsional vibration dampers are met with minimum constructive and material expense. Furthermore, a friction device of this type can be embodied compactly and manufactured simply.

Further, it is notable that this friction device 80, regardless of whether it happens to be operating in the first or the second friction area, advantageously acts in a speed-dependent manner, because the connections 85 between two respective friction elements 81 are embodied flexibly in both the radial and axial directions. Higher centrifugal forces resulting from a higher speed cause the axially larger sections 91 of the frictional elements 81 to rest in the radially outer area on the associated circumferential opening 87 and produce additional friction.

FIG. 4 shows another embodiment of the torsional vibration damper with an arrangement in the area of the radial bearing 17 that deviates constructively from the solution described above, whereby, according to FIG. 4, the drive-side cover plate 31 runs radially Inward almost to the attachment means 11 and is then curved toward the output side to produce a primary hub 92 that encompasses the radial bearing 17. The radial bearing 17 in turn encompasses the distance ring 12. All three components, seen in the axial direction, border the primary flange 2. This embodiment is especially simple and economical with respect to its constructive design.

FIG. 6 shows another embodiment in which the primary flange 2 is folded in the radially inner area to attain the axial balance relative to the crank shaft that is attained in the embodiment in FIG. 1 by the distance ring 12. Furthermore, the primary flange 2 is also curved toward the output side radially inward of the flange fold 94 for forming the primary hub 95. In a manner already described, the primary hub 95, on the primary flange 2, encompasses the radial bearing 17, which in turn encompasses the secondary hub 18 of the output side.

Figure 7:
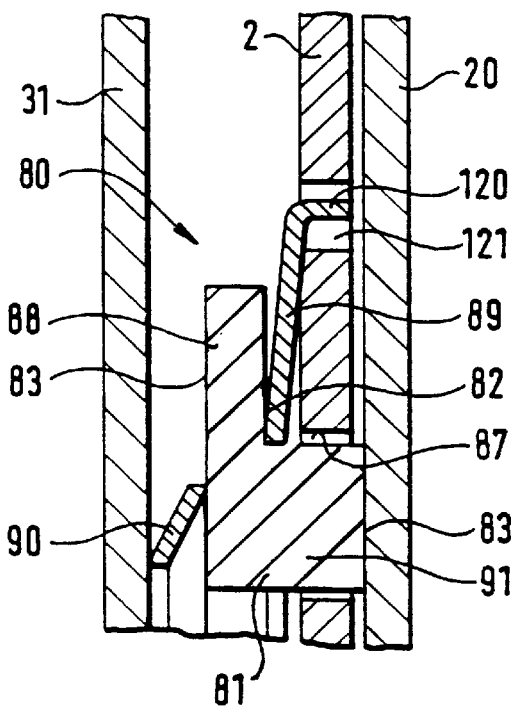
FIG. 7 shows a longitudinal section of another embodiment of the torsional damper with a friction device having different points of pressurization by axial springs.

The friction device shown in FIG. 7 differs from that described previously in that the axial springs 89, 90 act upon different locations of the friction elements 81. Thus, the axial spring 89 associated with the first friction area 82, as in the previously described drawings, acts axially between the primary flange 2 and each friction element 81. However, the axial spring 90 associated with the second friction area 83 is arranged on the opposite side of the primary flange. Apart from the purely spatial difference, the consequence of this change is that in the embodiment shown in FIG. 7, the size of second friction area 83 is limited solely to section 91 of the friction element 81. In the previously described embodiments of the friction elements 81, the second friction area 83 has a size composed of both sections 88 and 91 of the friction element 81. In both cases, the friction area is located on the counter side in the contact area between the respective axial spring 90 and the friction element 81. The choice of a friction device as in FIG. 1, for example, or in FIG. 7, will thus be based on which friction effect is desired for the second friction area 83.

In addition, it should be noted that in FIG. 7, the axial spring 89 includes primary-side tabs 120 distributed in the circumferential direction which engage associated recesses 121 on the primary flange 2 without clearance in the circumferential direction, to establish a positive lock and avoid slippage between the axial spring 89 and the primary flange 2.

Figure 8:
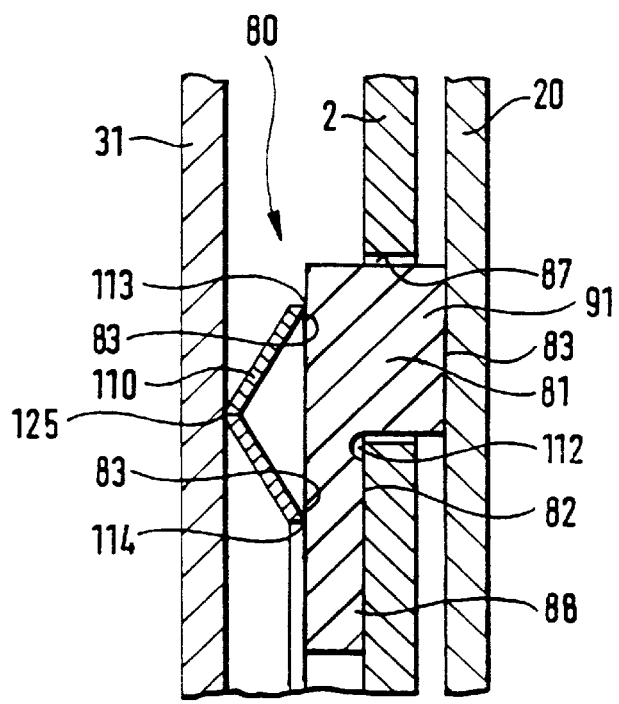
FIG. 8 shows a longitudinal section of another embodiment of the torsional damper as in FIG. 7, with a single axial spring on a friction element of the friction device.

According to FIG. 8, a common axial spring 110 is provided for both sections 88 and 91 of the friction element 81. This axial spring 110, compared with two independent axial springs, has technical production advantages. When ring-shaped axial springs of this type are produced, the inner disk-shaped part remaining when the ring is stamped is a waste piece. The waste can be minimized when the remaining ring of the axial spring 110 acts in the manner of two individual axial springs arranged coaxially to each other and connected radially to each other. Further, when the radially inner disk is stamped from this ring, it is possible to simultaneously create a perforation 125 in the axial spring 110. Before assembly or during operation of the torsional vibration damper, a deliberate break can be made at this perforation between the two parts of the original single axial spring 110, so that finally, without doubled material waste, there are two axial springs of different diameters. The connection of the two partial springs can also be designed so softly that the reciprocal influence of the two partial springs is minimized.

Figure 9:
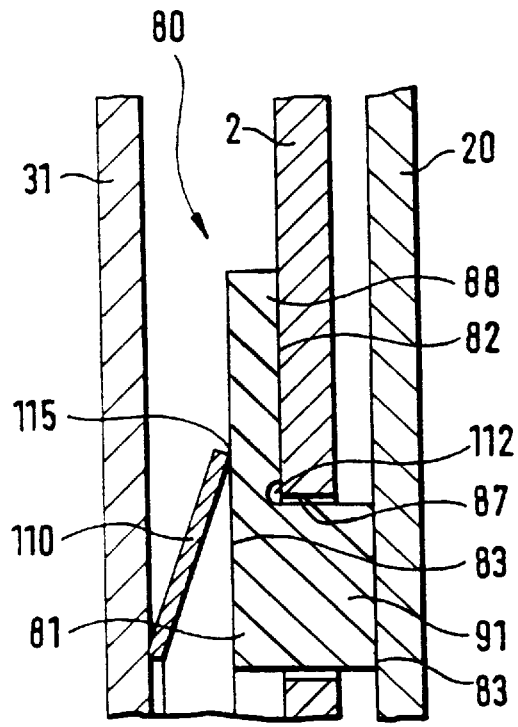
FIG. 9 shows a longitudinal section of another embodiment of the torsional damper as in FIG. 8, with a link between the individual sections of the friction element.

The friction element 81 of this embodiment has a link 112 radially positioned between the two sections 88, 91. The link 112 is a cross-sectional reduction in the axial direction and results in axial relative mobility between the two sections 88 and 91. A lever arm is therefore created relative to the link 112 when the pressurization points 113 and 114 of the axial spring 110 change with respect to their distance from the link 112. Diameter changes in the axial spring 110 can thus lead, via different lever arms relative to the link 112, to changes in the friction effect ratio between the first and second friction areas. The link 112 has an even more impressive effect when it is combined (as in FIG. 9) with an axial spring 110 that has only a single pressurization point 115 on the friction element 81, wherein the pressurization point 115 lies in the extension area of the link 112. Even the smallest diameter changes in the pressurization point 115 brought about by changes in the diameter of the axial spring 110 result in a detectable change in the friction effect ratio between the first friction area 82 and the second friction area 83.

Figure 10:
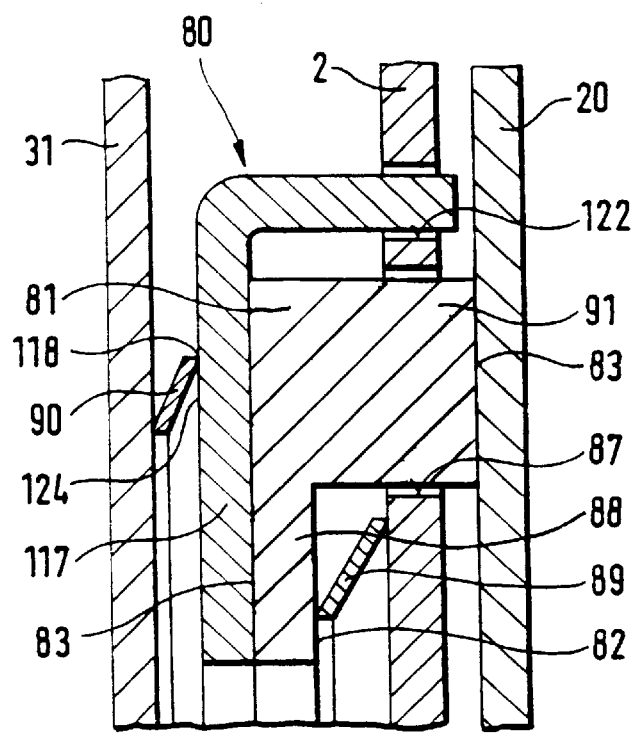
FIG. 10 shows a longitudinal section of another embodiment of a torsional damper as in FIG. 8, with an additional friction means adjacent the friction device.

In the embodiment shown in FIG. 10, a friction element 81 is combined with a friction means 117. The friction means 117 extends with clearance in the circumferential direction into a circumferential opening 122 in the primary flange 2. The actual friction portion of the friction means 117 lies axially between the friction element 81 and an axial spring 90, which itself is supported on the drive-side cover plate 31. The axial spring 89 associated with the first friction area 82 is clamped between the primary flange 2 and the section 88 of the friction element 81.

The friction device 80 in the embodiment of FIG. 10 functions as follows: During small relative deflections of the primary flange 2, when the clearance of the friction element 81 and the friction means 117 in the circumferential direction in the particular circumferential opening 87, 122 is not used up, friction exists in the first friction area 82 between the section 88 of the friction element 81 and the axial spring 89. The friction means 117 is arranged in its circumferential opening 122 with greater clearance than the friction element 81 has in its circumferential opening 87. As a result, in a second operating state when the friction element 81 is also taken along, the friction means 117 still follows the movement of the cover plates 20 and 31, because a friction lock between the friction means 117 and the cover plate 31 is still established via the axial spring 90. In this second operating state, the second friction area 83 is therefore created between the second section 91 of the friction element 81 and the cover plate 20, on the one hand, and by both sections 88 and 91 of the friction element 81 on the side of the friction means 117, on the other. In a third operating state, the friction means 117 is also moved by the primary flange as soon as it reaches the corresponding end of its circumferential opening 122 in the primary flange 2. In the third operating state, a third friction area 124 is located on the side of the friction means 117 that faces the axial spring 90.

Of course, it is also possible, by means of suitable material choice for the individual elements involved in the friction process, to shift the friction area to the other side of one of the axial springs. Furthermore, considerable influence on the friction effect on the individual friction areas can be exercised by the choice of material.

The invention is not limited by the embodiments described above which are presented as examples only but can be modified in various ways within the scope of protection defined by the appended patent claims.

We claim:

1. A torsional vibration damper for a vehicular transmission, comprising:
   a drive-side transmission element rotatable about an axis;
   an output-side transmission element rotatably deflectable relative to said drive-side transmission element about said axis;
   a friction device having a friction element positioned between said drive-side transmission element and said output side transmission element, wherein said friction element has at least two friction areas;
   one of said output-side transmission element and said drive-side transmission element comprising a first circumferential opening having two circumferential ends through which a portion of said friction element is inserted, thereby allowing a relative rotation of said friction element between said two circumferential ends with respect to said one of said output-side transmission element and said drive-side transmission element;
   wherein said friction element generates a first friction force with a first friction area of said at least two friction areas when said friction element is between the two circumferential ends and relatively rotatable with respect to said one of said output-side transmission element and said drive-side transmission element and said friction element generates a second friction force with a second friction area of said at least two friction areas when said friction element rests against one of the two circumferential ends of the first circumferential opening.

2. The torsional vibration damper of claim 1, wherein the friction device comprises a plurality of friction elements and connection pieces for connecting the plurality of friction elements.

3. The torsional vibration damper of claim 2, wherein said connection pieces are connected to said plurality of friction elements for allowing relative movements between individual ones of said plurality of friction elements.

4. The torsional vibration damper of claim 1, wherein said friction element comprises a first section arranged between said output-side transmission element and said drive-side transmission element and a second section arranged between said output-side transmission element and said drive-side transmission element and having a portion which is received in the first circumferential opening, wherein said first section comprises the first friction area and said second section comprises the second friction area.

5. The torsional vibration damper of claim 4, further comprising a first axial spring operatively connected to said friction element for activating the first section of said friction element and a second axial spring operatively connected to said friction element for activating the second section of said friction element.

6. The torsional vibration damper of claim 5, further comprising a deformable link operatively arranged for axially movably connecting the first section and the second section of said friction element.

7. The torsional vibration damper of claim 6, wherein said link comprises a cross-sectional radial narrowing of the friction element between the first section and the second section.

8. The torsional vibration damper as in claim 6, wherein said first axial spring and said second axial spring contact said friction element at first and second pressurization points that are radially movable with respect to a distance to the deformable link.

9. The torsional vibration damper of claim 4, wherein said one of said output-side transmission element and said drive-side transmission element further comprises:
   a second circumferential opening with a greater circumferential clearance than the first circumferential opening; and
   a friction means arranged between the friction element and the other one of said output-side transmission element and said drive-side transmission element and penetrating the second circumferential opening, wherein a third friction area of said at least two friction areas generates a third friction force when said friction means rests on one of the circumferential sides of said second circumferential opening.

10. The torsional vibration damper of claim 4, firer comprising a common axial spring operatively connected to said friction element for activating the first section and the second section of said friction element.

11. The torsional vibration damper of claim 10, wherein said common axial spring comprises a perforation at a predetermined diameter along the circumference and said common axial spring is dividable at the perforation under a force applied to the common axial spring into two mutually independent axial springs.

12. The torsional vibration damper of claim 10, further comprising a deformable link operatively arranged for axially movably connecting the first section and the second section of said friction element.

13. The torsional vibration damper of claim 12, wherein said link comprises a cross-sectional radial narrowing of the friction element between the first section and the second section.

14. The torsional vibration damper as in claim 12, wherein said common axial spring contacts said friction element at a pressurization point that is radially movable with respect to a distance to the deformable link.

* * * * *